United States Patent
Skala et al.

(10) Patent No.: US 12,502,671 B2
(45) Date of Patent: Dec. 23, 2025

(54) SYSTEMS AND METHODS FOR CLASSIFYING T CELL ACTIVATION STATE

(71) Applicant: Wisconsin Alumni Research Foundation, Madison, WI (US)

(72) Inventors: Melissa C. Skala, Middleton, WI (US); Kayvan Samimi, Madison, WI (US); Emmanuel Contreras-Guzman, Madison, WI (US); Alexandra Jule Walsh, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1256 days.

(21) Appl. No.: 17/322,367

(22) Filed: May 17, 2021

(65) Prior Publication Data

US 2021/0354143 A1 Nov. 18, 2021

Related U.S. Application Data

(60) Provisional application No. 63/025,756, filed on May 15, 2020.

(51) Int. Cl.
*B01L 3/00* (2006.01)
*C12N 5/00* (2006.01)
(Continued)

(52) U.S. Cl.
CPC ...... *B01L 3/502761* (2013.01); *C12N 5/0087* (2013.01); *C12N 5/0636* (2013.01);
(Continued)

(58) Field of Classification Search
None
See application file for complete search history.

(56) References Cited

U.S. PATENT DOCUMENTS

| | | |
|---|---|---|
| 2012/0276578 A1 | 11/2012 | Stringari et al. |
| 2020/0070166 A1 | 3/2020 | Skala et al. |
| 2021/0354143 A1 | 11/2021 | Skala et al. |

FOREIGN PATENT DOCUMENTS

| | | |
|---|---|---|
| WO | 2019075409 A1 | 4/2019 |
| WO | 2021232011 | 11/2021 |

OTHER PUBLICATIONS

Ma et al., "Label-Free Metabolic Classification of Single Cells in Droplets Using the Phasor Approach to Fluorescence Lifetime Imaging Microscopy", Cytometry Part A, 95A, pp. 93-100, published online Dec. 11, 2018. (Year: 2018).*

(Continued)

*Primary Examiner* — Rebecca M Giere
(74) *Attorney, Agent, or Firm* — Quarles & Brady LLP

(57) ABSTRACT

Systems and methods for classifying T cells by activation state are disclosed. The system includes a cell analysis pathway, a time-resolved autofluorescence decay spectrometer, a processor, and a non-transitory computer-readable memory. The memory is accessible to the processor and has stored thereon instructions. The instructions, when executed by the processor, cause the processor to: a) receive the time-resolved autofluorescence decay signal; b) compute at least a first phasor coordinate at a first frequency and a second phasor coordinate at a second frequency from the time-resolved autofluorescence decay signal, wherein the first and second frequency are different; and c) compute an activation prediction for the T cell using at least the first phasor coordinate and the second phasor coordinate.

11 Claims, 11 Drawing Sheets

(51) Int. Cl.
  *C12N 5/0783* (2010.01)
  *G01N 15/10* (2024.01)
  *G01N 15/14* (2006.01)
  *G01N 15/149* (2024.01)

(52) U.S. Cl.
  CPC .. *G01N 15/1459* (2013.01); *B01L 2200/0652* (2013.01); *B01L 2200/143* (2013.01); *B01L 2300/0663* (2013.01); *B01L 2300/0864* (2013.01); *C12N 2521/00* (2013.01); *C12N 2529/10* (2013.01); *G01N 2015/1006* (2013.01); *G01N 15/149* (2024.01)

(56) References Cited

OTHER PUBLICATIONS

Walsh et al., "Label-free Method for Classification of T cell Activation", bioRxiv—The preprint server for Biology; posted Jan. 31, 2019. (Year: 2019).*

Digman, M.A., Caiolfa, V.R., Zamai, M., & Gratton, E., "The Phasor Approach to Fluorescence Lifetime Imaging Analysis," Biophysical Journal: Biophysical Letters, 94(2), L14-L16, (2008).

Gomez, C.A., Sutin, J., Wu, W., Fu, B., Uhlirova, H., Devor, A., et al., (2018) "Phasor analysis of NADH FLIM identifies pharmacological disruptions to mitochondrial metabolic processes in the rodent cerebral cortex," PLOS One, 13(3): e0194578., https://doi.org/10.1371/journal.pone.0194578.

International Search Report and Written Opinion issued in corresponding PCT Application No. US2021/032762, issued Aug. 24, 2021.

Sanchez, S., Bakas, L., Gratton, E., Herlax, V., (2011) "Alpha Hemolysin Induces an Increase of Erythrocytes Calcium: A Flim 2-Photon Phasor Analysis Approach," PLos One 6(6): e21127. doi:10.1371/journal.pone.0021127.

Shields et al., "Microfluidic cell sorting: a review of the advances in the separation of cells from debulkling to rare cell isolation," Lab Chip, Mar. 7, 2015, 15(5): 1230-49.

Weber, G. (1981), "Resolution of the fluorescence lifetimes in a heterogeneous system by phase and modulation measurements," The Journal of Physical Chemistry, 85(8), 949-953.

* cited by examiner

SYSTEMS AND METHODS FOR CLASSIFYING T CELL ACTIVATION STATE

CROSS-REFERENCE TO RELATED APPLICATIONS

This application claims the benefit of U.S. Provisional Application No. 63/025,756, filed May 15, 2020, which is incorporated herein by reference.

STATEMENT REGARDING FEDERALLY FUNDED RESEARCH

This invention was made with government support under CA205101 awarded by the National Institutes of Health. The government has certain rights in the invention.

BACKGROUND

One new cancer treatment being studied is CAR T cell (Chimeric Antigen Receptor T cell) therapy. CAR T cell therapy uses a patient's own cells and "re-engineers" them to fight cancer. It is a very complex treatment. Collecting and altering the cells is difficult, and CAR T cell therapy often causes very severe side effects. At this time, it is only offered at a few major cancer centers. To date, most of the patients treated with CAR T cells have been people with blood cancers.

The procedure starts with removing the patient's own T cells from their blood and sending them to a lab where they are altered to produce proteins called chimeric antigen receptors (CARs) on the surface of the cells. These special receptors allow the T cells to help identify and attack cancer cells. The "super-charged" T cells are multiplied and grown at the lab, then frozen and shipped back to the medical facility, where they re-inject these treated CAR T cells back into the patient's blood.

Current methods to determine T cell activation include flow cytometry, immunofluorescence imaging, and immunohistochemistry, but these methods require contrast agents and may require tissue or cell fixation. A need exists for systems and methods for classifying and/or sorting T cells by activation state in a fashion that allows the classified and/or sorted T cells to be used in subsequent procedures, such as CAR T cell therapy.

SUMMARY

In an aspect, the present disclosure provides a T cell classification device. The device includes a cell analysis pathway, a time-resolved autofluorescence decay spectrometer, a processor, and a non-transitory computer-readable medium. The cell analysis pathway includes an inlet, an observation zone, and an outlet. The observation zone is coupled to the inlet downstream of the inlet. The observation zone is configured to present T cells for individual time-resolved autofluorescence interrogation. The outlet is coupled to the observation zone downstream of the observation zone. The time-resolved autofluorescence decay spectrometer is configured to acquire a time-resolved autofluorescence decay signal for a T cell positioned in the observation zone. The time-resolved autofluorescence decay spectrometer comprises a pulsed light source, a photon-counting detector, and photon-counting electronics. The processor is in electronic communication with the time-resolved autofluorescence decay spectrometer. The non-transitory computer-readable medium is accessible to the processor. The non-transitory computer-readable medium has stored thereon instructions. The instructions, when executed by the processor, cause the processor to: a) receive the time-resolved autofluorescence decay signal; b) compute at least a first phasor coordinate at a first frequency and a second phasor coordinate at a second frequency from the time-resolved autofluorescence decay signal, wherein the first and second frequency are different; and c) compute an activation prediction for the T cell using at least the first phasor coordinate and the second phasor coordinate.

In another aspect, the present disclosure provides a method of characterizing T cell activation state. The method includes: a) receiving a population of T cells having unknown activation status; b) acquiring a time-resolved autofluorescence decay signal from a T cell of the population of T cells; c) computing at least a first phasor coordinate at a first frequency and a second phasor coordinate at a second frequency from the time-resolved autofluorescence decay signal, wherein the first and second frequency are different; and d) identifying an activation status of the T cell based on an activation prediction, wherein the activation prediction is computed using at least the first phasor coordinate and the second phasor coordinate.

In a further aspect, the present disclosure provides a method of classifying T cells. The method includes: a) receiving a population of T cells having unknown activation status; b) acquiring a time-resolved autofluorescence decay signal for each T cell of the population of T cells, thereby resulting in a set of time-resolved autofluorescence decay signals; c) computing at least a first phasor coordinate at a first frequency and a second phasor coordinate at a second frequency from each time-resolved autofluorescence decay signal of the set of time-resolved autofluorescence decay signals; and either: d1) physically isolating a first portion of the population of T cells from a second portion of the population of T cells based on an activation prediction, wherein each T cell of the population of T cells is placed into the first portion when the activation prediction exceeds a predetermined threshold and into the second portion when the activation prediction is less than or equal to the predetermined threshold; or d2) generating a report identifying a proportion of the population of T cells having an activation prediction that exceeds the predetermined threshold. The activation prediction is computed using at least the first phasor coordinate and the second phasor coordinate.

BRIEF DESCRIPTIONS OF THE DRAWINGS

Figure 7:
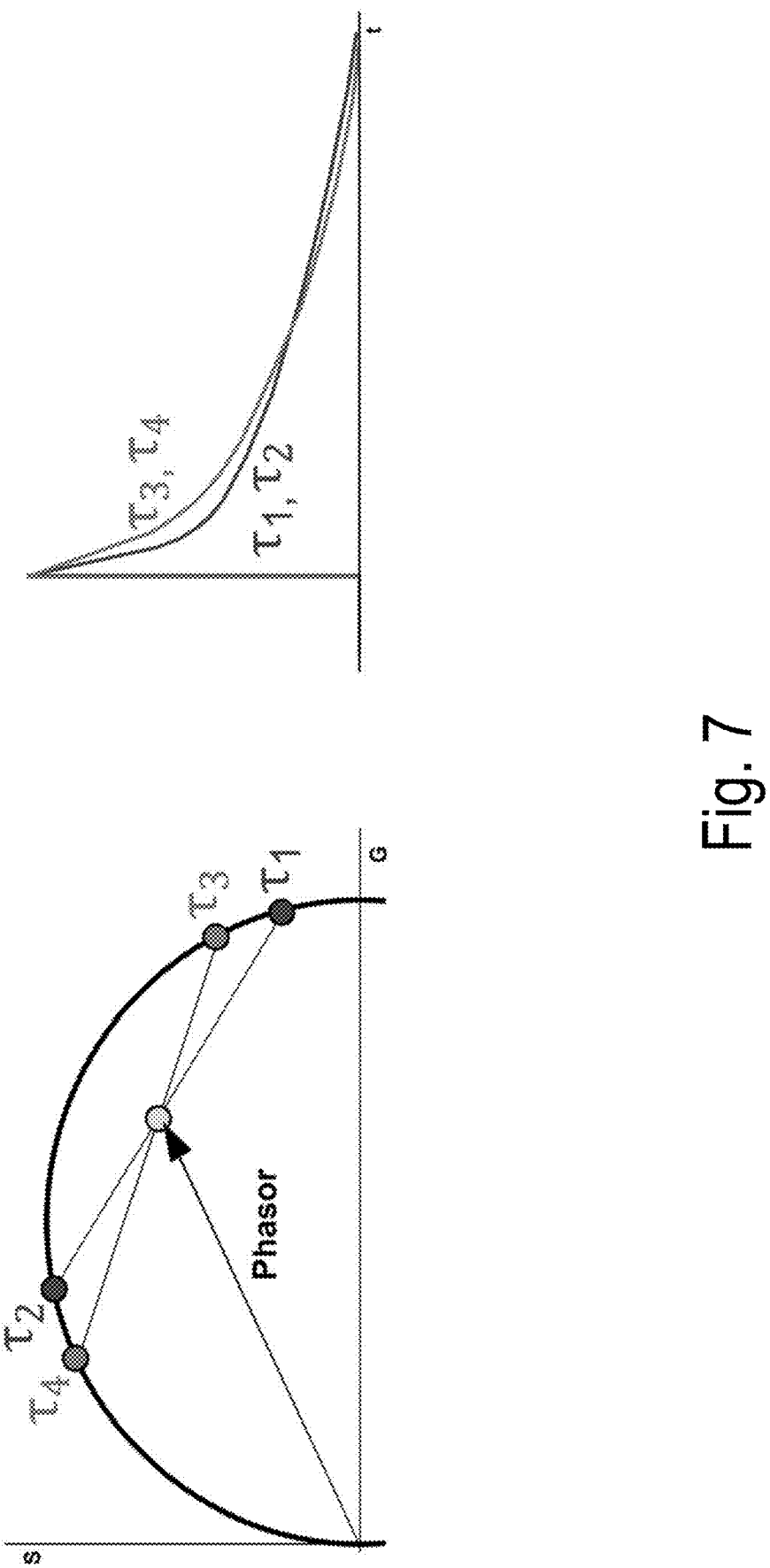

FIG. 7 is an illustration of the ambiguity of the phasor representation. A given phasor within the universal semicircle can represent different decay profiles. Adapted from the Becker & Hickl TCSPC Handbook.

Figure 8:
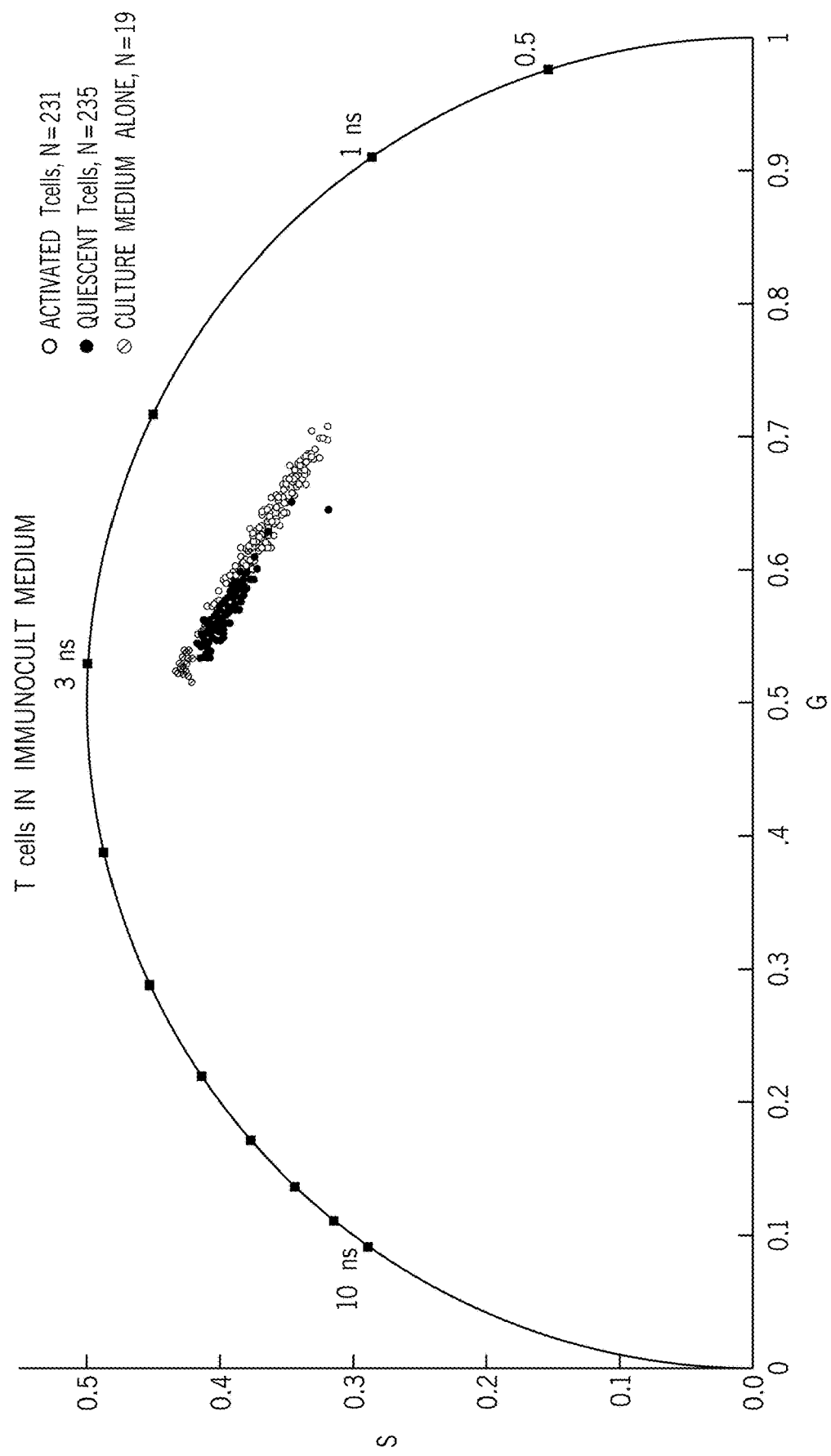

FIG. 8 is a phasor plot (at 80 MHz) of activated and naive T cells in the standard activation medium provides visual separation of the two experimental conditions.

Figure 9:
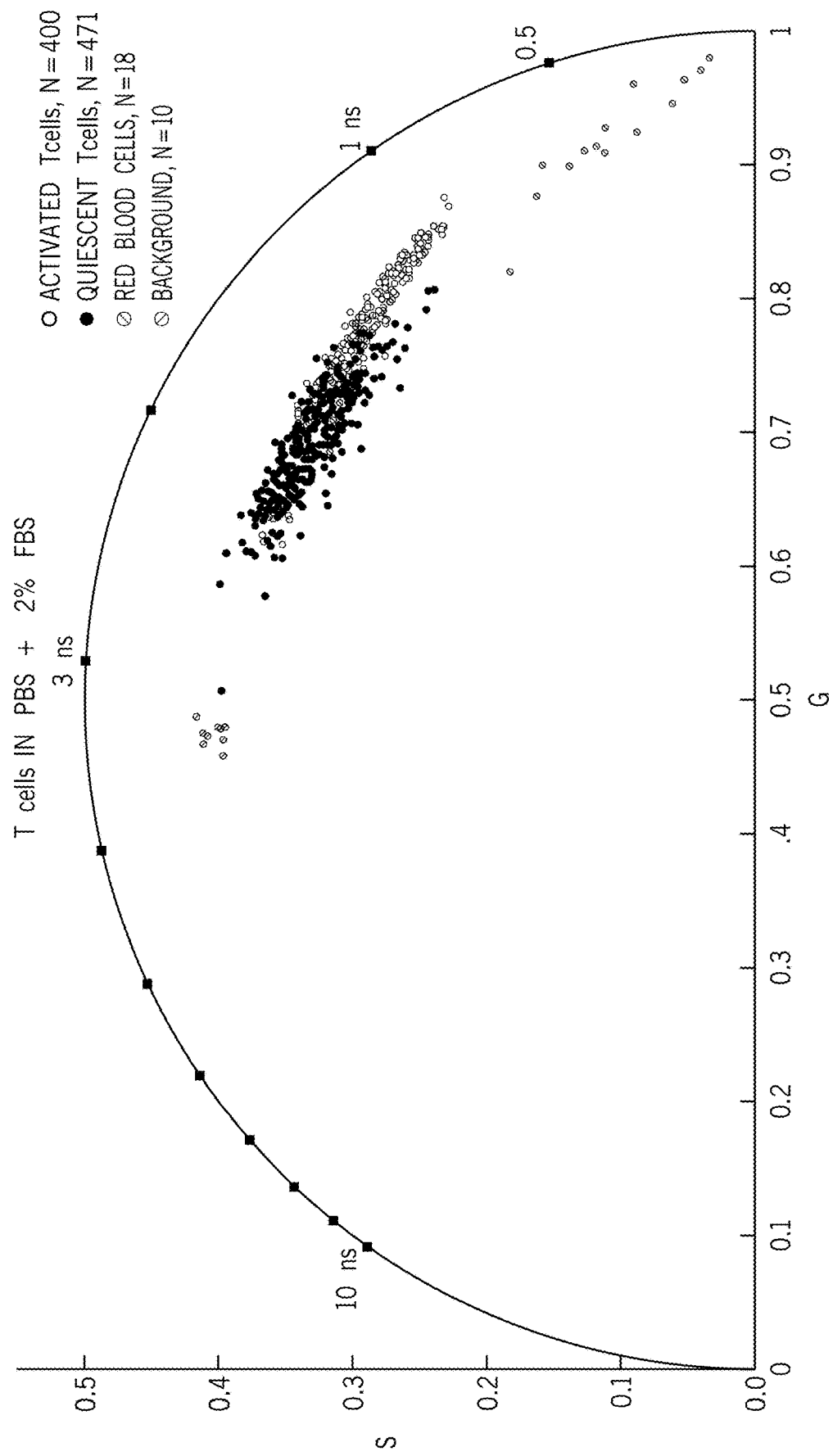

FIG. 9 is a phasor plot (at 80 MHz) of the activated and naive T cells in phosphate buffered saline plus fetal bovine serum (PBS+FBS) provides visual separation of the two experimental conditions as well as the lowest background fluorescence.

Figure 10:
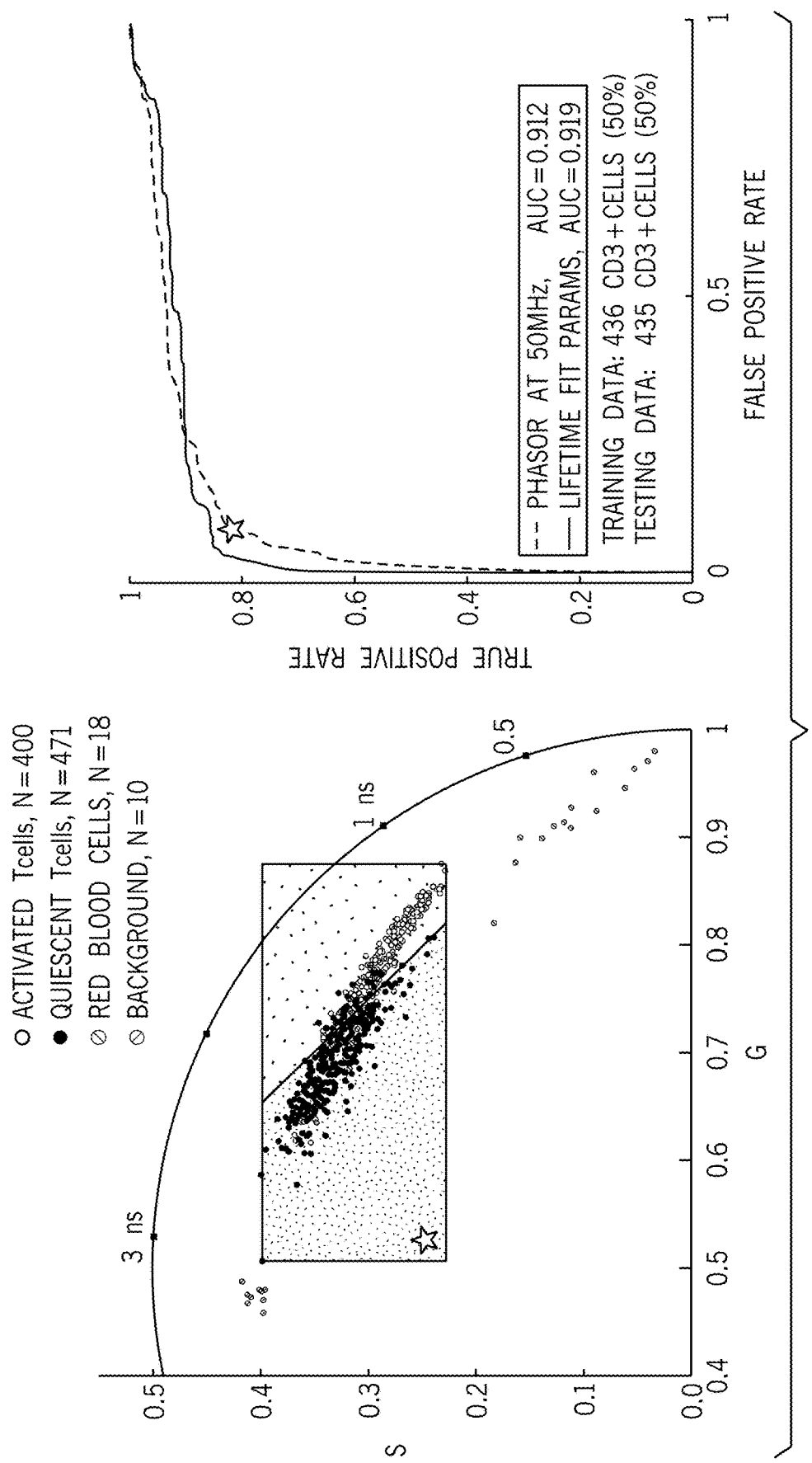

FIG. 10 is a plot showing receiver operating characteristic (ROC) curves for logistic regression classifiers using different autofluorescence decay features.

Figure 11:
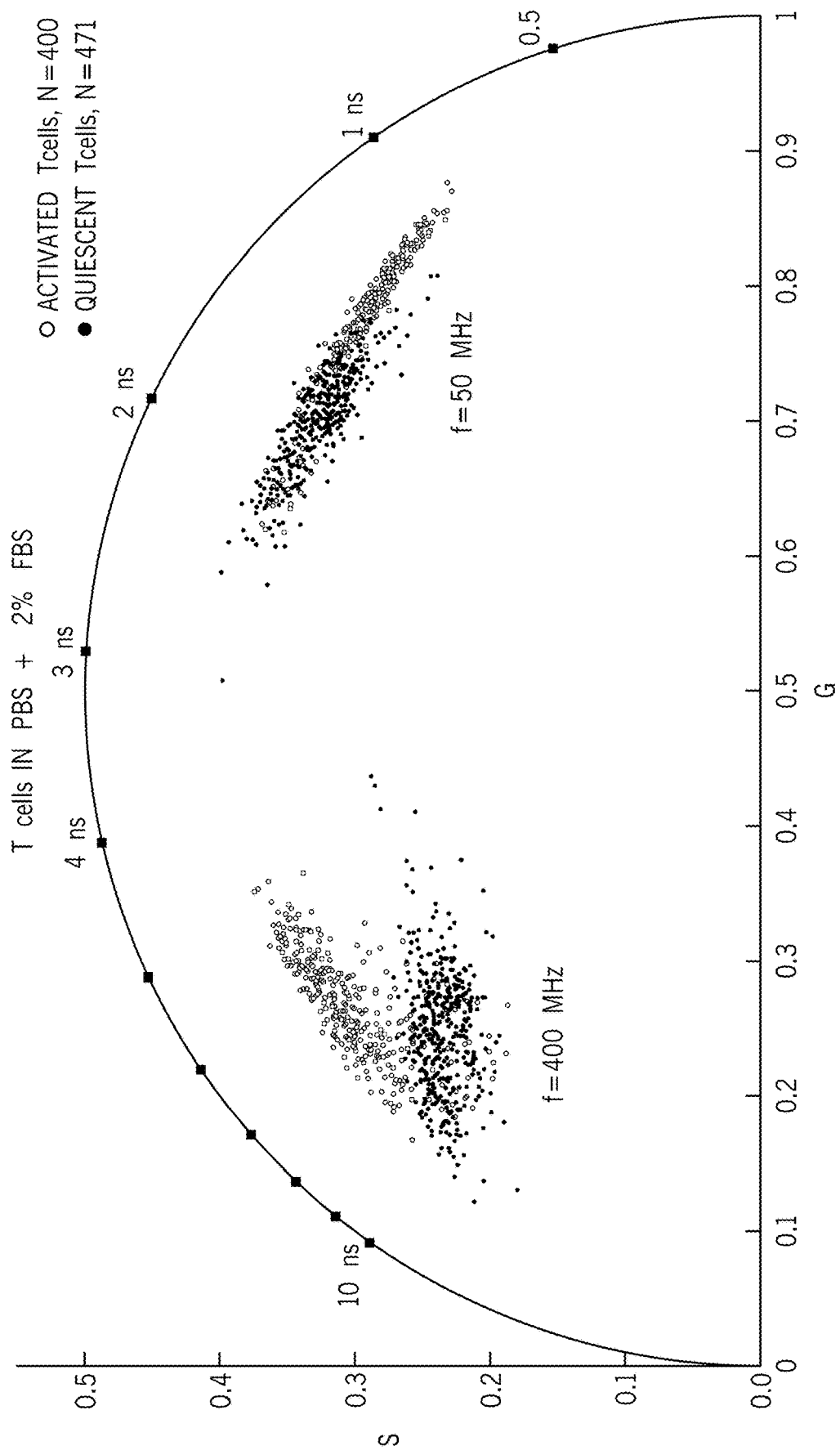

FIG. 11 is a plot showing that inclusion of phasor coordinates at the second harmonic frequency provides additional contrast between the two experimental conditions (activated vs. naive).

DETAILED DESCRIPTION

Before the present invention is described in further detail, it is to be understood that the invention is not limited to the particular embodiments described. It is also understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

Specific structures, devices and methods relating to modifying biological molecules are disclosed. It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

As used herein, the terms "activated" and "activation" refer to T cells that are CD3+, CD4+, and/or CD8+.

As used herein, the term "FAD" refers to flavin adenine dinucleotide.

As used herein, the term "memory" includes a nonvolatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

As used herein, the term "NAD(P)H" refers to reduced nicotinamide adenine dinucleotide and/or reduced nicotinamide dinucleotide phosphate.

As used herein, the term "processor" may include one or more processors and memories and/or one or more programmable hardware elements. As used herein, the term "processor" is intended to include any of types of processors, CPUs, GPUs, microcontrollers, digital signal processors, or other devices capable of executing software instructions.

The various aspects may be described herein in terms of various functional components and processing steps. It should be appreciated that such components and steps may be realized by any number of hardware components configured to perform the specified functions.

Methods

This disclosure provides a variety of methods. It should be appreciated that various methods are suitable for use with other methods. Similarly, it should be appreciated that various methods are suitable for use with the systems described elsewhere herein. When a feature of the present disclosure is described with respect to a given method, that feature is also expressly contemplated as being useful for the other methods and systems described herein, unless the context clearly dictates otherwise.

Figure 1:
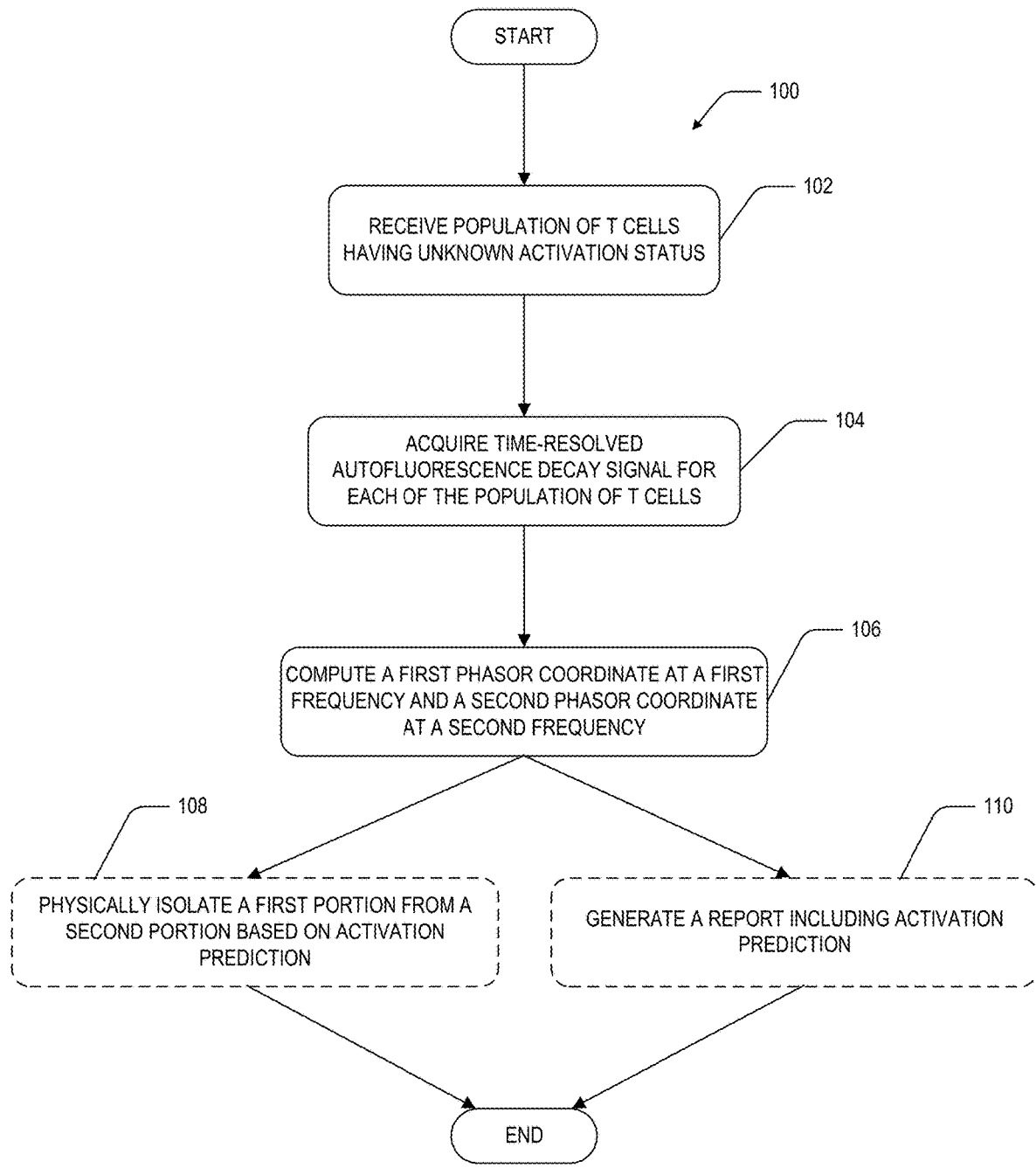
FIG. 1 is a flowchart illustrating a method, in accordance with an aspect of the present disclosure.

Referring to FIG. 1, the present disclosure provides a method 100 of classifying T cells. At process block 102, the method 100 includes receiving a population of T cells having unknown activation status. The population of T cells can itself be contained within a broader population of cells that includes some cells that are not T cells, such as red blood cells and the like. At process block 104, the method 100 includes acquiring a time-resolved autofluorescence decay signal for each T cell of the population of T cells, thereby resulting in a set of time-resolved autofluorescence decay signals. At process block 106, the method 100 includes computing at least a first phasor coordinate at a first frequency and a second phasor coordinate at a second frequency from each time-resolved autofluorescence decay signal of the set of time-resolved autofluorescence decay signals. Following process block 106, the method 100 can proceed to process block 108 or 110, depending on the desired outcome. In some cases, the method 100 proceeds to process block 108 and process block 110, in either order. While process blocks 108 and 110 are both illustrated and described as optional, the method 100 includes either process block 108 or process block 110. At optional process block 108, the method 100 optionally includes physically isolating a first portion of the population of T cells from a second portion of the population of T cells based on an activation prediction, wherein each T cell of the population of T cells is placed into the first portion when the activation prediction exceeds a predetermined threshold and into the second portion when the activation prediction is less than or equal to the predetermined threshold. At optional process block 110, the method 100 optionally includes generating a report including the activation prediction. The report optionally includes identifying a proportion of the population of T cells having an activation prediction that exceeds a predetermined threshold. The activation prediction is computed using the first phasor coordinate and the second phasor coordinate.

Figure 2:
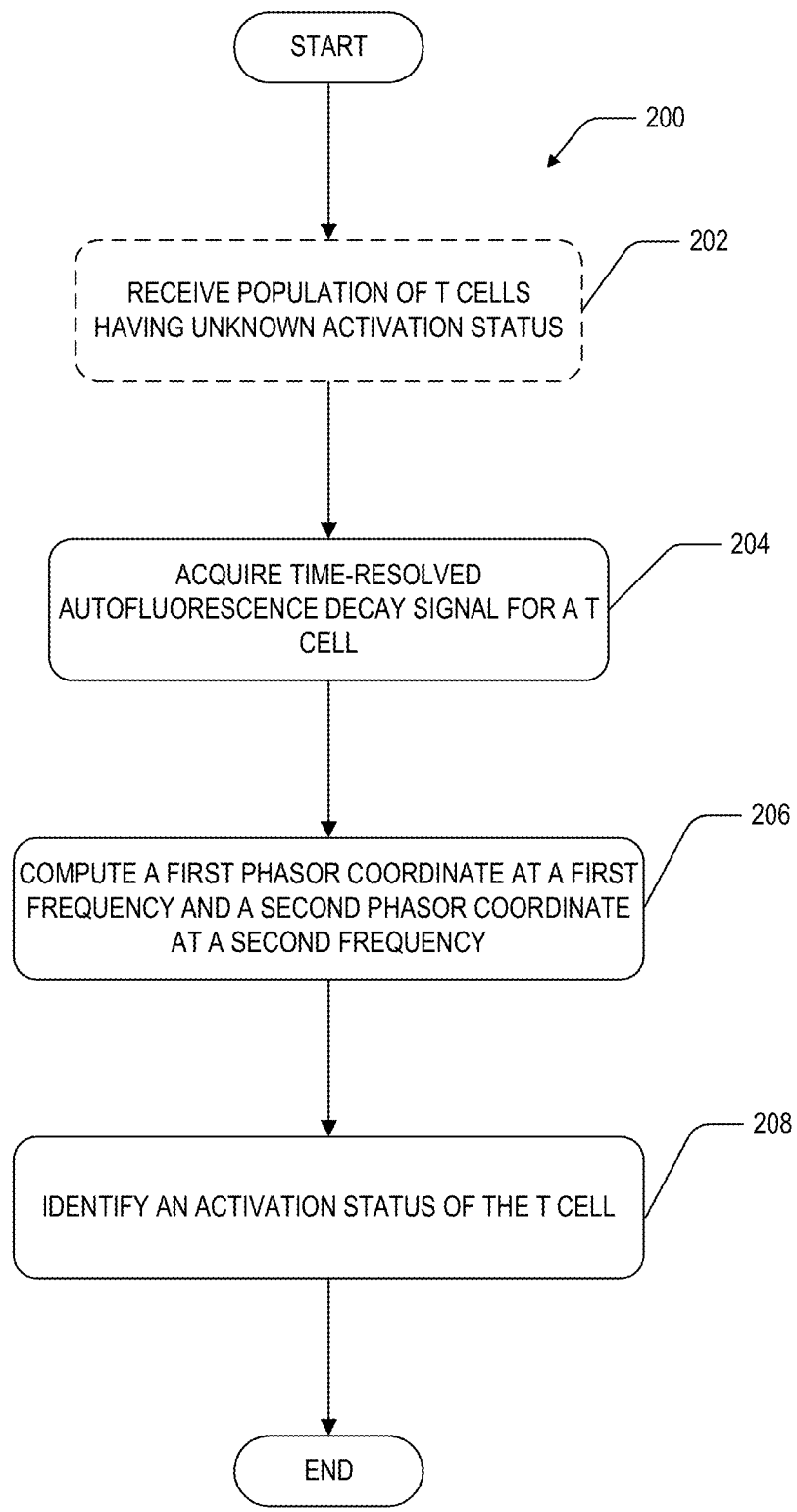
FIG. 2 is a flowchart illustrating a method, in accordance with an aspect of the present disclosure.

Referring to FIG. 2, the present disclosure provides a method 200 of characterizing T cell activation state. At optional process block 202, the method 200 optionally includes receiving a population of T cells having unknown activation status. At process block 204, the method 200 includes acquiring a time-resolved autofluorescence decay signal from a T cell of the population of T cells. At process block 206, the method 200 includes computing at least a first phasor coordinate at a first frequency and a second phasor coordinate at a second frequency from the time-resolved autofluorescence decay signal, wherein the first and second frequency are different. At process block 208, the method 200 includes identifying an activation status of the T cell based on an activation prediction, wherein the activation prediction is computed using at least the first phasor coordinate and the second phasor coordinate.

Method 100 and method 200 are related to one another and can be utilized together. For example, method 200 can be utilized within method 100. Aspects described with respect to method 100 can be utilized in method 200, unless the context clearly dictates otherwise, and vice versa.

The time-resolved autofluorescence decay signal acquired at process block 104 or 204 can be acquired in a variety of ways, as would be understood by one having ordinary skill in the spectroscopic arts with knowledge of this disclosure and their own knowledge from the field. The specific way in which the time-resolved autofluorescence decay signal is acquired is not intended to be limiting to the scope of the present invention, so long as the time-resolved autofluorescence decay signals necessary for the methods described herein can be suitably measured, estimated, or determined in any fashion. One example of a suitable time-resolved autofluorescence decay signal acquisition is described below in the Examples section.

The physical isolation operation of optional process block 108 is in response to an activation prediction determined from the acquired autofluorescence decay signal. If the activation prediction exceeds a predetermined threshold for a given T cell, then that T cell is placed into the first portion. If the activation prediction is less than or equal to the predetermined threshold for the given T cell, then that T cell is placed into the second portion. The result of this physical isolation is that the first portion of the population of T cells is significantly enriched in activated T cells, whereas the second portion of the population of T cells is significantly depleted of activated T cells.

In some cases, the physical isolation operation of optional process block 108 can include isolating cells into three, four, five, six, or more portions. In these cases, the different portions will be separated by a number of predetermined thresholds that is one less than the number of portions (i.e., three portions=two predetermined thresholds). The portion whose activation prediction exceeds all of the predetermined thresholds (i.e., exceeds the highest threshold) contains the greatest concentration of activated T cells. The portion whose activation prediction fails to exceed any of the predetermined thresholds (i.e., fails to exceed the lowest threshold) contains the lowest concentration of activated T cells. Using multiple predetermined thresholds can afford the preparation of portions of the population of T cells that have extremely high or extremely low concentrations of activated T cells. In some cases, the physical isolation operation of optional process block 108 (or a totally separate aspect of method 100, as would be appreciated by those having ordinary skill in the cell isolation arts) can include isolating other kinds of cells, such as red blood cells or the like, or various kinds of debris so they are not included in the portions including T cells.

The activation status of method 100 and 200 is computed using the first phasor coordinate and the second phasor coordinate for a given T cell of interest as an input. The activation value is computed using an equation that is generated by a machine-learning process on data for a population of T cells having a known activation state using the first phasor coordinate and the second phasor coordinate as variables.

NAD(P)H molecules exist in one of two binding states; either free or protein-bound. Free and bound NAD(P)H exhibit different fluorescence decay profiles that are temporally short and long, respectively. Therefore, the measured time-resolved autofluorescence decay profile of a cell is modeled as a bi-exponential decay function (1) where the two exponential terms represent these two states and the coefficients represent the relative abundance of NAD(P)H in either state.

$$I(t) = I_0(\alpha_1 e^{-t/\tau_1} + \alpha_2 e^{-t/\tau_2} + \alpha_{background}) + \text{noise}. \tag{1}$$

Standard practice in analysis of time-resolved fluorescence decay data is to fit this model to the measured data using an iterative optimization algorithm that minimizes some cost function (e.g., sum of squared errors). While accurate, this approach is computationally burdensome, and thus, not amenable to real-time analysis. As such, it is often used in post-processing of the acquired data.

Fit-free approaches to analysis of fluorescence decay data are typically faster and better suited to real-time analysis. The phasor analysis method ([Weber, G. (1981). Resolution of the fluorescence lifetimes in a heterogeneous system by phase and modulation measurements. *The Journal of Physical Chemistry*, 85(8), 949-953.] [Digman, M. A., Caiolfa, V. R., Zamai, M., & Gratton, E. (2008). The phasor approach to fluorescence lifetime imaging analysis. *Biophysical journal*, 94(2), L14-L16.]) is a fit-free approach that is used in this implementation. The phasor of a discretized temporal decay profile at any given frequency is a complex number derived by enumerating the discrete-time Fourier transform of the decay profile at that frequency. It can be expressed in the polar coordinate system as a {modulus, phase} pair, also known as {magnitude, angle} pair, also known as {amplitude, phase} pair. Alternatively, it can be expressed in the Cartesian coordinate system as a {real part, imaginary part} pair, also known as {G, S} pair, also known as {cosine, sine} pair. The mathematical expression of the phasor is given in (2).

$$\mathcal{J}_{1/T}(f) = \mathcal{J}_{2\pi/T}(\omega) = \mathcal{J}_{2\pi}(2\pi fT) = \frac{\sum_{n=0}^{N-1} T \cdot I(nT) e^{-i2\pi fTn}}{\sum_{n=0}^{N-1} T \cdot I(nT)}, \tag{2}$$

$$\mathcal{J}(\omega) = \mathcal{G}(\omega) - i\mathcal{S}(\omega), \tag{3}$$

Where subscripts denote frequency periodicity intervals, T is the temporal sampling interval (i.e., decay histogram bin width), N is the number of time bins in the discrete decay profile, and I is the continuous-time fluorescence decay intensity as in (1).

In simpler terms, for a normalized discrete fluorescence decay profile, $\tilde{I}[nT]$, the real and imaginary parts of the phasor are given by:

$$\mathcal{G}(\omega) = \sum_{n=0}^{N-1} \tilde{I}[nT] \cdot \cos(\omega nT), \tag{4}$$

$$\mathcal{S}(\omega) = \sum_{n=0}^{N-1} \tilde{I}[nT] \cdot \sin(\omega nT). \tag{5}$$

It is clear that calculation of the phasor is a linear algebraic operation which can be performed instantaneously with execution of a single command, in contrast to the iterative fitting optimization algorithms.

For a simple single-exponential fluorescence decay profile, $I(t)=I_0 e^{-t/\tau}$, with background fluorescence and noise neglected, (2) can be simplified to give the following real and imaginary parts of the phasor (for sufficiently small sampling interval):

$$\mathcal{J}(\omega) = \frac{1}{1+i\omega\tau} = \frac{1}{1+(\omega\tau)^2} - i\frac{\omega\tau}{1+(\omega\tau)^2} = \mathcal{G}(\omega) - iS(\omega). \quad (6)$$

In this case, phasor coordinates G and S are positively signed and conform to $(\mathcal{G}(\omega)-\frac{1}{2})^2+(S(\omega)-0)^2=(\frac{1}{2})^2$, which is the equation for a circle centered at $(\frac{1}{2}, 0)$. Thus, it is evident that all such single-exponential decays will have their phasor coordinates fall onto this "universal semicircle". On this semicircle, a phasor corresponding to a very short lifetime is close to the point $(1, 0)$, while a phasor corresponding to a very long lifetime will be close to the point $(0, 0)$.

When several, K, exponential components contribute to the decay profile, the phasor coordinates are given by the linear combination of the individual component phasors:

$$\mathcal{G}(\omega) = \sum_{k=1}^{K} \frac{\alpha_k}{1+(\omega\tau_k)^2}, \quad (7)$$

$$S(\omega) = \sum_{k=1}^{K} \frac{\alpha_k \omega\tau_k}{1+(\omega\tau_k)^2}. \quad (8)$$

Figure 6:
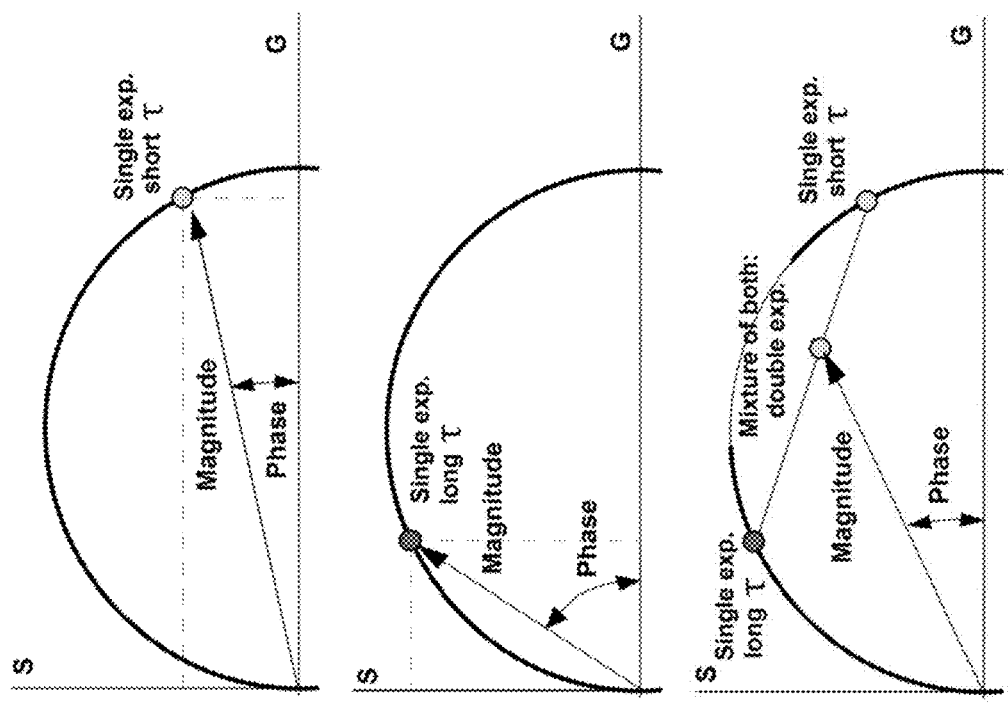
FIG. 6 is an illustration showing a bi-exponential decay profile (left) and its corresponding phasor representation (right). Adapted from the Becker & Hickl TCSPC Handbook.
Figure 6:
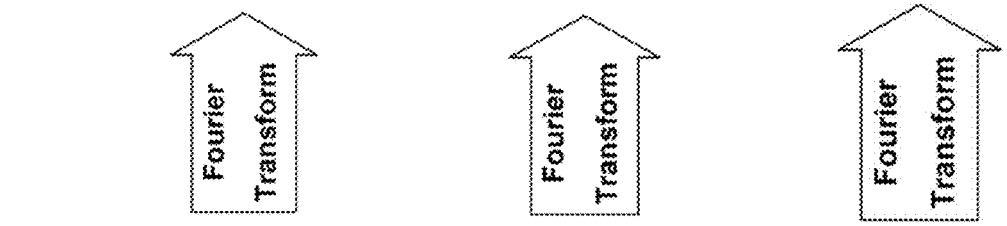
Figure 6:
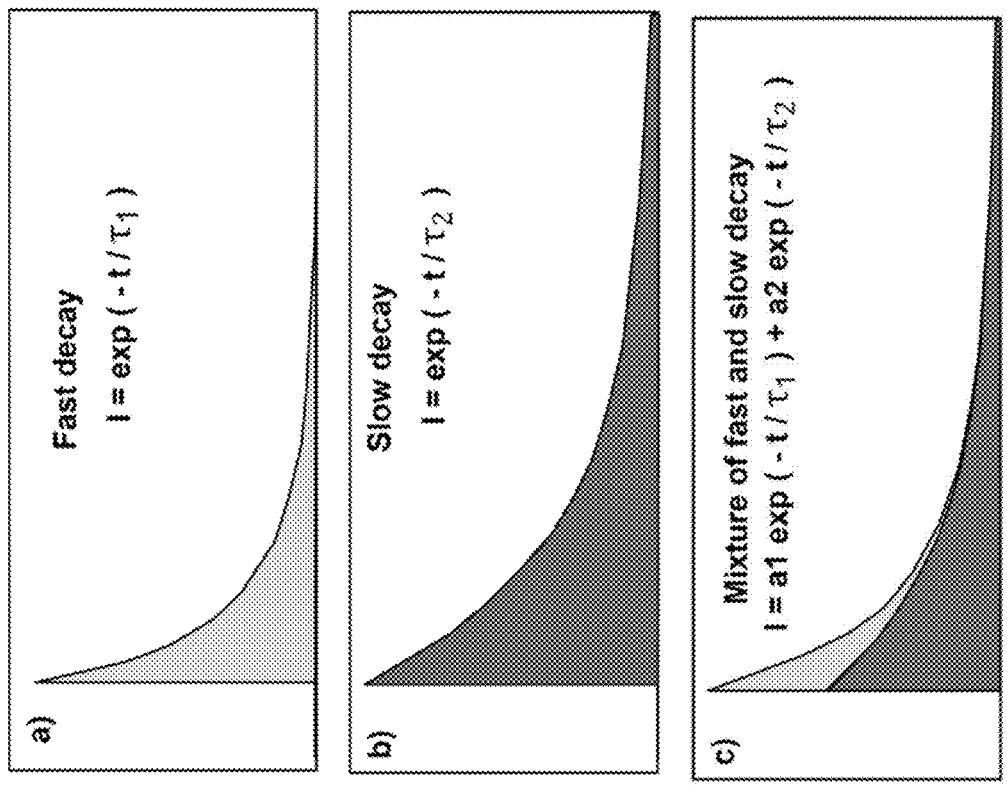

The weights, $\alpha_k$, in (7) and (8) are the fractional contributions of the individual components. For example, phasor location of a mixture of two species falls on a straight line joining the phasor location of the two individual species on the universal semicircle (FIG. 6). The position on this line is determined by the relative fractional contributions of each species. Similarly, the phasor representation of a three-exponential species will fall in the triangle formed by the three individual phasor locations, and so on for higher order multi-exponentials.

The calculated phasor coordinates are often corrected for the effects of the instrument response function (IRF). If the IRF is separately measured in advance, this correction takes the form of a simple matrix multiplication as described by [Gómez, C. A., Sutin, J., Wu, W., Fu, B., Uhlirova, H., Devor, A., . . . & Yaseen, M. A. (2018). Phasor analysis of NADH FLIM identifies pharmacological disruptions to mitochondrial metabolic processes in the rodent cerebral cortex. *PloS one*, 13(3)—Appendix].

While the phasor representation of a single-exponential decay uniquely identifies its fluorescence lifetime, the same is not true for more complex, multi-exponential decays. For example, FIG. 7 shows how the same phasor coordinates can arise from two different bi-exponential decays with separate short and long component lifetimes. [G Weber, 1981] showed that component lifetimes and fractional contributions of a complex multi-exponential decay, consisting of N components with distinct lifetimes, can be determined from measurements of phase and modulation at N appropriate harmonic excitation frequencies.

Since NAD(P)H has a bi-exponential decay, the present disclosure uses phasor representations of its time-resolved decay profile, calculated at two separate frequencies, to uniquely characterize the autofluorescence decay from any given cell. Unlike Weber's approach, the present disclosure does not attempt to solve for the model parameters (i.e., fractional contributions and lifetimes). Rather, the present disclosure uses the two pairs of phasor coordinates as standalone features that provide a similar contrast between biological conditions (e.g., activated vs. quiescent immune cell state) to what is achievable from extracting the model parameters from a fitting approach. Other researchers ([Sanchez, S., Bákas, L., Gratton, E., & Herlax, V. (2011). Alpha hemolysin induces an increase of erythrocytes calcium: a FLIM 2-photon phasor analysis approach. *PloS one*, 6(6).]) have used phasor coordinates calculated at the second harmonic frequency of the excitation laser in order to provide separation of fluorophores when the first harmonic frequency phasor plot produced overlapping coordinates. However, phasor coordinates from multiple frequencies have not previously been used concurrently to provide complementary information about the underlying complex decay. This approach also has not been previously used for NAD(P)H measurements, nor to classify cells by conditions.

Previous work involving at least one inventor of the present disclosure highlighted the discovery that calculating the free NAD(P)H fractional ratio, $\alpha_1$, provides information about the activation state of immune cells with high accuracy and precision. In the present disclosure, calculating the phasor coordinates at two separate frequencies provides information about the activation state of immune cells with similarly high accuracy and precision, and that exact determination of fractional contributions and component lifetimes is not necessary for achieving this contrast. However, these specific decay parameters can be estimated from phasor analysis, if needed, albeit with less accuracy than that achievable using the fitting approaches. It should be appreciated, at least based on the results presented in the Examples section below, that fitting to a single phasor at a single frequency also provides meaningful classification results. However, the two (or more) phasor approach using different frequencies provided unexpectedly good results.

The method 100 or method 200 can utilize more than two phasors, including but not limited to, three phasors, four phasors, and five or more phasors. Each of these additional phasors can be computed at a different frequency. These frequencies can be related to the first and second frequencies (i.e., harmonics) or can be unrelated to the first and second frequencies.

The method 100 can sort CD4+, CD3+, and/or CD8+ T cells based on activation status.

The method 100 can provide surprising accuracy of classifying T cells as activated. The accuracy can be at least 85%, at least 87.5%, at least 90%, at least 92.5%, at least 95%, at least 96%, at least 97%, or at least 98%. One non-limiting example of measuring the accuracy includes executing the method 100 on a given cell with unknown activation state and then using one of the traditional methods for determining activation state (which will typically be a destructive method) for a number of cells that is statistically significant.

The method 100 or method 200 can be performed without the use of a fluorescent label for binding the T cell. The method 100 or method 200 can be performed without immobilizing the T cell.

Figure 3:
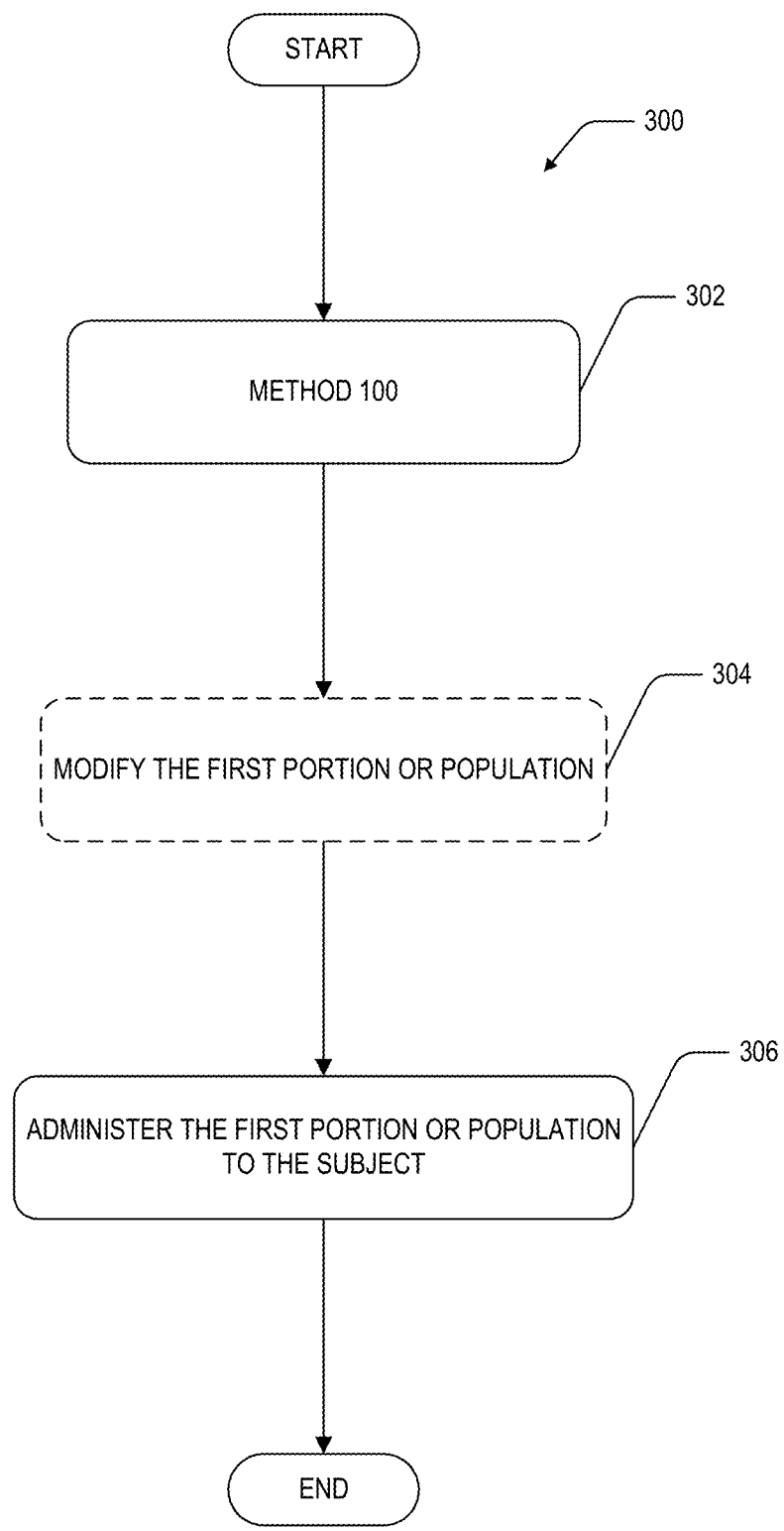
FIG. 3 is a flowchart illustrating a method, in accordance with an aspect of the present disclosure.

Referring to FIG. 3, the present disclosure provides a method 300 of administering activated T cells to a subject in need thereof. At process block 302, the method 300 includes the method 100 described above, which results in a first portion of the population of T cells enriched for activation (when optional process block 108 is utilized) or results in a report identifying the proportion of T cells that are activated (when optional process block 110 is utilized). At optional process block 304, the method 300 optionally includes modifying the first portion of the population of T cells or the population of T cells. At process block 306, the method 300 includes administering the first portion of the population of T cells, if the cells have been sorted, or the population of T cells, if the cells have not been sorted, to the subject.

The T cells can be harvested from the subject to which they are administered prior to sorting. The T cells can be either directly introduced to the subject or can undergo additional processing prior to introduction to the subject. In one case, the T cells can be modified to contain chimeric antigen receptors (CARs).

The methods described herein provided surprising results to the inventors. First, it was unclear if the mathematical concept of phasors would be capable of meaningfully classifying T cell activity. Second, it was not clear how to implement this concept. Third, there was no indication in the art that the use of two different frequencies would provide the surprisingly impressive classification achieved by the present disclosure.

Systems

This disclosure also provides systems. The systems can be suitable for use with the methods described herein. When a feature of the present disclosure is described with respect to a given system, that feature is also expressly contemplated as being combinable with the other systems and methods described herein, unless the context clearly dictates otherwise.

Figure 4:
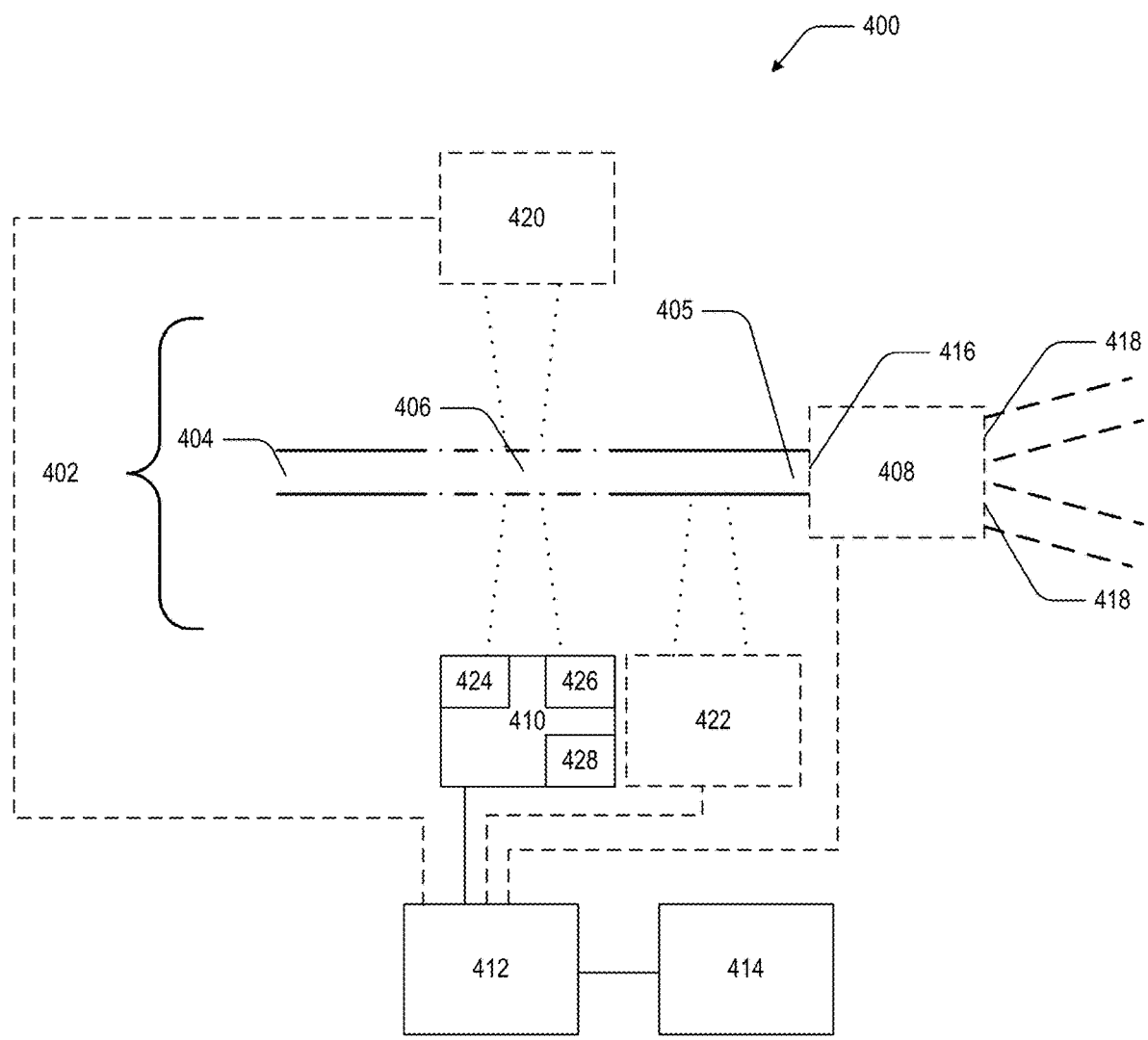
FIG. 4 is a block diagram of a device, in accordance with an aspect of the present disclosure.

Referring to FIG. 4, the present disclosure provides a T cell classification device 400. The device 400 includes a cell analysis pathway 402. The cell analysis pathway 402 includes an inlet 404, an observation zone 406, and an outlet 405. The device 400 optionally includes a cell sorter 408. The observation zone 406 is coupled to the inlet 404 downstream of the inlet 404 and is coupled to the outlet 405 upstream of the outlet 405. The device 400 also includes a single-cell time-resolved autofluorescence decay spectrometer 410. The device 400 includes a processor 412 and a non-transitory computer-readable medium 414, such as a memory. In some configurations, the processor 412 can be or otherwise include a field-programmable gate array (FPGA). In configurations where the processor 412 is an FPGA, an additional processor (not shown) may be included to capture images.

The inlet 404 can be any nanofluidic, microfluidic, or other cell sorting inlet. A person having ordinary skill in the art of fluidics has knowledge of suitable inlets 404 and the present disclosure is not intended to be bound by one specific implementation of an inlet 404.

The outlet can be any nanofluidic, microfluidic, or other cell sorting outlet. A person having ordinary skill in the art of fluidics has knowledge of suitable outlets 405 and the present disclosure is not intended to be bound by one specific implementation of an outlet 405.

The observation zone 406 is configured to present T cells for individual time-resolved autofluorescence decay interrogation. A person having ordinary skill in the art has knowledge of suitable observation zones 406 and the present disclosure is not intended to be bound by one specific implementation of an observation zone 406.

The optional cell sorter 408 has a sorter inlet 416 and at least two sorter outlets 418. The cell sorter is coupled to the observation zone 406 via the sorter inlet 416 downstream of the observation zone 406. The cell sorter 408 is configured to selectively direct a cell from the sorter inlet 416 to one of the at least two sorter outlets 418 based on a sort signal.

The inlet 404, observation zone 406, outlet 405, and optional cell sorter 408 can be components known to those having ordinary skill in the art to be useful in high-throughput cell screening devices or flow sorters, including commercial flow sorters. The cell analysis pathway 402 can further optionally include a flow regulator, as would be understood by those having ordinary skill in the art. The flow regulator can be configured to provide flow of cells through the observation zone at a rate that allows the time-resolved autofluorescence decay spectrometer 410 to acquire the autofluorescence decay signal. A useful review of the sorts of fluidics that can be used in combination with the present disclosure is Shields et al., "Microfluidic cell sorting: a review of the advances in the separation of cells from debulking to rare cell isolation," Lab Chip, 2015 Mar. 7; 15(5): 1230-49, which is incorporated herein by reference in its entirety.

The time-resolved autofluorescence decay spectrometer 410 includes a pulsed light source 424, a photon-counting detector 426, and photon-counting electronics 428.

The time-resolved autofluorescence decay spectrometer 410 can be any spectrometer suitable for acquiring time-resolved autofluorescence decay signals as understood by those having ordinary skill in the optical arts.

Suitable pulsed light sources 424 include, but are not limited to, lasers, LEDs, lamps, filtered light, fiber lasers, and the like. The light source 424 can be pulsed, which includes sources that are naturally pulsed and continuous sources that are chopped or otherwise optically modulated with an external component.

The light source 424 can provide pulses of light having a full-width at half maximum (FWHM) pulse width that is of a duration that is adequate to achieve the spectroscopic goals described herein, as would be appreciated by one having ordinary skill in the spectroscopic arts. In some cases, the FWHM pulse width is at least 1 fs, at least 5 fs, at least 10 fs, at least 25 fs, at least 50 fs, at least 100 fs, at least 200 fs, at least 350 fs, at least 500 fs, at least 750 fs, at least 1 ps, at least 3 ps, at least 5 ps, at least 10 ps, at least 20 ps, at least 50 ps, or at least 100 ps. In some cases, the FWHM pulse width is at most 10 ns, at most 1 ns, at most 900 ps, at most 750 ps, at most 600 ps, at most 500 ps, at most 400 ps, at most 250 ps, at most 175 ps, at most 100 ps, at most 75 ps, at most 60 ps, at most 50 ps, at most 35 ps, at most 25 ps, at most 20 ps, at most 15 ps, at most 10 ps, or at most 1 ps.

The light source 424 can emit wavelengths that are tuned to the absorption of NAD(P)H and/or FAD. In some cases, the wavelength is at least 340 nm, at least 345 nm, at least 350 nm, at least 355 nm, at least 360 nm, at least 365 nm, or at least 370 nm. In some cases, the wavelength is at most 415 nm, at most 410 nm, at most 405 nm, at most 400 nm, at most 395 nm, at most 390 nm, at most 385 nm, or at most 380 nm. In some cases, the wavelength is between 340 nm and 415 nm, between 350 nm and 410 nm, or between 370 nm and 380 nm. In some cases, the wavelength is 375 nm. In some cases, the wavelength is 2 times or 3 times these wavelength values (i.e., the frequency is ½ or ⅓). It should be appreciated that pulsed light sources inherently have some degree of bandwidth, so they are never exactly monochromatic. Thus, references herein to "wavelength" refer to either a wavelength at the peak intensity or a weighted average wavelength. In some cases, the pulsed light source 424 is a UV pulsed diode laser. In some cases, the pulsed light source has a wavelength that is double the peak absorption wavelength of NAD(P)H and/or FAD, with an ultrashort pulse duration, such that fluorescence excitation is achieved through two-photon excitation events, as understood by those having ordinary skill in the optical arts.

The photon-counting detector 426 can be any detector suitably capable of detecting single photons and delivering an analog or digital output representative of the detected photons. Examples of photon-counting detectors 426 include, but are not limited to, a photomultiplier tube, a photodiode, an avalanche photodiode, a single-photon avalanche diode (SPAD), a charge-coupled device, combinations thereof, and the like.

The photon-counting electronic 428 can include electronics understood by those having ordinary skill in the art to be suitable for use with single-photon detectors 426 to produce the decay signals described herein. Examples of suitable photon-counting electronics 428 include, but are not limited to, a field-programmable gate array (FPGA), a dedicated digital signal processor (DSP) with a digitizer and a time-to-digital converter, a time-correlated single photon counting (TCSPC) electronic board with time-to-amplitude and analog-to-digital converter electronics (as implemented by Becker & Hickl, Berlin, Germany), combinations thereof, and the like.

The time-resolved autofluorescence decay spectrometer 410 can be directly (i.e., the processor 412 communicates directly with the spectrometer 410 and receives the signals) or indirectly (i.e., the processor 412 communicates with a sub-controller that is specific to the spectrometer 410 and the signals from the spectrometer 410 can be modified or unmodified before sending to the processor 412) controlled by the processor 412. Time-resolved autofluorescence decay signals can be acquired by known spectroscopic methods. Fluorescence lifetime images can also be acquired by known imaging methods and those acquired images can be used by the systems and methods described herein, as would be understood by those having ordinary skill in the spectroscopic arts. The device 400 can include various optical filters tuned to isolate autofluorescence signals of interest. The optical filters can be tuned to the autofluorescence wavelengths of NAD(P)H and/or FAD.

The time-resolved autofluorescence decay spectrometer 410 can be configured to acquire the autofluorescence dataset from the detector's 426 electrical output at a repetition rate understood by those having ordinary skill in the spectroscopic arts to be suitable for providing adequate sampling to observe the dynamics disclosed herein. In some cases, the repetition rate can be at least 1 kHz, at least 5 kHz, at least 10 kHz, at least 30 kHz, at least 50 kHz, at least 100 kHz, at least 500 kHz, at least 750 kHz, at least 1 MHz, at least 4 MHz, at least 7 MHz, at least 10 MHz, at least 15 MHz, at least 20 MHz, at least 50 MHz, at least 100 MHz, at least 500 MHz, or at least 1 GHz. In some cases, the repetition rate can be at most 1 THz, at most 800 GHz, at most 500 GHz, at most 250 GHz, at most 150 GHz, at most 100 GHz, at most 70 GHz, at most 50 GHz, at most 25 GHz, at most 15 GHz, at most 10 GHz, at most 6 GHz, at most 2 GHz, at most 1 GHz, at most 750 MHz, at most 500 MHz, at most 400 MHz, at most 250 MHz, at most 175 MHz, or at most 100 MHz. While there can be downside associated with oversampling, in principle the present disclosure can function with as high of a sampling rate as can be achieved with existing technology. The repetition rates identified herein are based on the state of the art at the time the present disclosure was prepared and filed and are not intended to be limiting in the event that future developments facilitate a greater repetition rate.

The pulsed light source 424 can be configured to operate at pulse repetition rates that are adapted to acquire the needed fluorescence lifetime information. The maximum pulse repetition rate is limited by the fluorescence lifetime of the fluorophore of interest. The fluorescence decay must have fully died down by the time the next pulse of light is introduced to the sample in order to avoid ambiguity about the sources of decay signals (i.e., was this particular fluorescent photon initiated by the most recent excitation pulse of light or the one preceding it?). The pulsed light source 424 can have a pulse repetition rate of up to 100 MHz, up to 80 MHz, up to 60 MHz, or up to 40 MHz. The lower limit of the pulse repetition rate is more practical in a sense of reducing the overall sampling time, but theoretically the data can be taken very slowly if there is some reason to do so.

The device 400 can optionally include an optical microscope 420 for acquiring visual images of cells that are located in the observation zone 406 or elsewhere along the cell analysis pathway 402.

The device 400 can optionally include a cell size measurement tool 422. The cell size measurement tool 422 can be any device capable of measuring the size of cells, including but not limited to, an optical microscope, such as optical microscope 420. In some cases, the optical microscope and the cell size measurement tool 422 are the same subsystem.

In some cases, the time-resolved autofluorescence decay spectrometer 410 and the optical microscope 420 can be integrated into a single optical subsystem. In some cases, the time-resolved autofluorescence decay spectrometer 410 and the cell size measurement tool 422 can be integrated into a single optical subsystem. While some aspects of the methods described herein can operate by not utilizing the cell size as an input to the convolutional neural network, it may be useful to measure the cell size for other purposes.

The processor 412 is in electronic communication with the spectrometer 410. The processor 412 is also in electronic communication with, when present, the optional cell sorter 408, the optional optical microscope 420, and the optional cell size measurement tool 422.

The non-transitory computer-readable medium 414 has stored thereon instructions that, when executed by the processor, cause the processor to execute at least a portion of the methods described herein. Equations for which the first and second phasor coordinates are inputs can also be stored on the non-transitory computer-readable medium 414. The non-transitory computer-readable medium 414 can be local to the device 400 or can be remote from the device, so long as it is accessible by the processor 412.

The device 400 can be substantially free of fluorescent labels (i.e., the cell analysis pathway 402 does not include a region for mixing the cell(s) with a fluorescent label). The device 400 can be substantially free of immobilizing agents for binding and immobilizing T cells.

Figure 5:
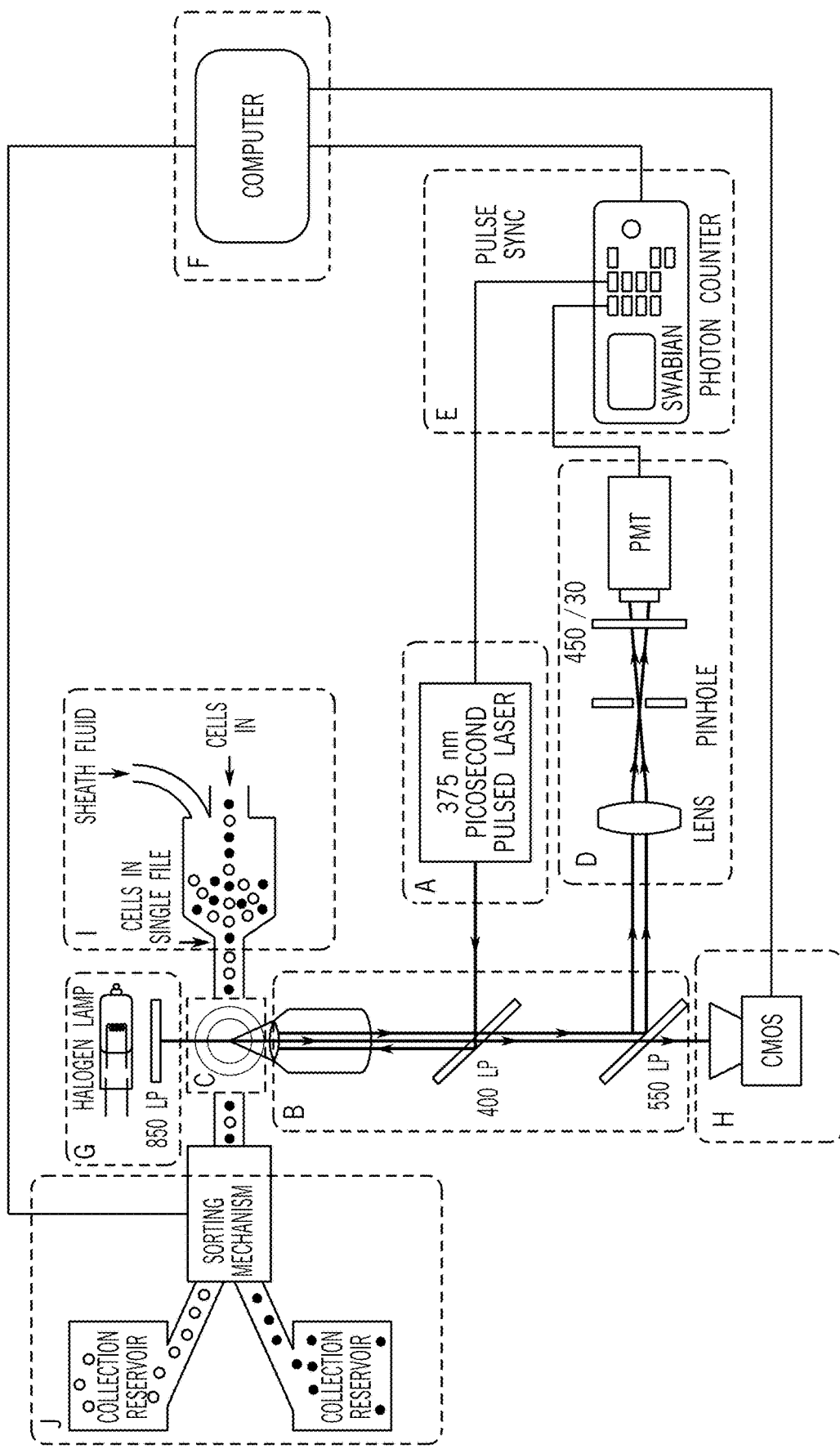
FIG. 5 is diagram of one specific implementation of a device, in accordance with aspects of the present disclosure.

Referring to FIG. 5, one specific implementation of a device in accordance with the present disclosure is illustrated.

Example 1

FIG. 5 shows the schematic diagram of optical and electronic parts, excitation and emission light paths, and fluidic flow and cell sorting mechanisms utilized in the present example. It should be appreciated that this is a non-limiting specific aspect of the present disclosure.

As with all other methods for time-resolved measurement of fluorescence decay, the decay profile is sampled over many thousands of repeated cycles of excitation followed by detection of emitted decay photons. Therefore, a pulsed excitation light source is used with a temporal pulse width that is much shorter (i.e., by a factor of 100 or more) than the decay lifetime. To measure metabolically-significant NAD(P)H autofluorescence, a pulsed laser at a wavelength of 375 nm is used as the excitation light source. The excitation light travels through the optical light path and illuminates a spot roughly the size of a single immune cell within the field of view of an objective lens focused on the interrogation region of the flow chamber.

The autofluorescence emission travels back through the objective lens and the optical path, and is sent to the detection arm of the system. A focusing lens and a confocal pinhole reject out-of-focus light. The in-focus light that makes it past the pinhole is filtered to only allow the emission spectrum of NAD(P)H autofluorescence (435-465 nm). A photomultiplier tube (PMT) detects emission photons and converts them to an analog electrical signal which is passed to the photon counting electronics.

TCSPC (time-correlated single photon counting) is the standard time-domain fluorescence lifetime measurement method and relies on a time-to-amplitude conversion circuit to register the photon arrival times. Unlike TCSPC, this implementation uses fast FPGA-based (field-programmable gate array) electronics that digitize the analog PMT signal and for every photon event, defined as PMT signal surpassing a user-defined threshold, record a digital time stamp from a fast clock. The digital PMT time stamps are numerically subtracted from similarly acquired laser pulse sync time stamps to build up a histogram of photon arrival times (i.e., the temporal NAD(P)H decay profile) for the immune cell being interrogated.

While the autofluorescence measurement is underway, a high-framerate video camera sensor (either CMOS: complementary metal-oxide-semiconductor or CCD: charge-coupled device) captures a bright-field image of the immune cell under interrogation to provide additional information about shape and size of the cell. The illumination for this imaging is provided by an incandescent microscope lamp (e.g., a halogen lamp) that is filtered to pass only the near-infrared portion of its spectrum, in order to avoid interference with NAD(P)H autofluorescence detection.

In FIG. 5, the system is broken down into functional blocks. Table 1 sets forth the components contained within those functional blocks and identifies commercial sources for these components where appropriate.

TABLE 1

| Block label | Block description | Manufacturer | Part numbers |
|---|---|---|---|
| A | Pulsed excitation UV laser source | Omicron | QuixX ® 375-70 PS |
| B | Optical light path, longpass dichroic mirrors, and objective lens | Nikon Thorlabs | Nikon Eclipse Ti-S Nikon CFI Super Fluor 40X air Nikon Plan Fluor 100X Oil |
| C | Flow cell interrogation window | In house | |
| D | Detection arm: confocal pinhole, emission filter, and PMT | Thorlabs Hamamatsu | P50D - Ø1" H10721 |
| E | Photon counting electronics | Swabian Instruments | Time Tagger Ultra 8 |
| F | Computer and display | Dell | |
| G | Bright-field illumination light source and longpass filter | Nikon Thorlabs | Nikon D-LH/LC FGL850S |
| H | CMOS camera for bright-field imaging | Basler | acA1300-200 um Ace |
| I | Microfluidic pump and custom flow cell | ElveFlow | OB1 MK3+ |
| J | Sorting mechanism | In house | |

Peripheral blood was drawn from a healthy donor into a sterile syringe containing heparin. CD8+ T cells were extracted from whole blood and cultured in T cell activation media. Twenty four hours post-isolation, a tetrameric antibody for CD2/CD3/CD28 was added to the culture media to activate the T cells. T cells in a control dish were not activated and were kept in their naïve state. NAD(P)H autofluorescence decays were collected from single cells in either dish using the prototype system described above. In addition to T cells, fluorescence decays were collected from leftover red blood cells (RBC) as well as the background fluorescence of the culture media (Bckgrnd). In addition to the standard activation medium, decays were collected from activated and naïve T cells that were re-plated in phosphate buffered saline plus fetal bovine serum (PBS+FBS), as well as a specialized low-fluorescent modified DMEM medium (FluoroBrite DMEM, ThermoFisher). T cells were interrogated using a 100× oil-immersion objective (NA=1.3) or a 40× air gap objective (NA=0.9). The picosecond pulsed UV laser was operated at a pulse repetition rate of 80 MHz and an output power level of 2 mW at the sample plane. Emission light was detected by a bialkali PMT (H10721, Hamamatsu) and time-resolved decays were recorded by the FPGA-based time tagging electronics (Time Tagger Ultra 8, Swabian Instruments) in the form of 12.5 ns histograms with bin width of 100 ps over an integration time period of 10 seconds per cell. The second harmonic generation signal from red blood cells (RBC) was used as the instrument response function (IRF). Autofluorescence decays were deconvolved from the IRF and fit to a bi-exponential model in order to extract short and long component lifetimes and their fractional contributions. Separately, the phasor coordinates were calculated from each cell's decay at the laser pulse repetition frequency (80 MHz) as well as its second harmonic (160 MHz). The resulting decay features (i.e., fit parameters $\alpha 1$, $t1$, $t2$, $tm$, and phasor parameters $g1$, $s1$, $g2$, $s2$) were compared between the activated and the control dish populations. These features were then used to train and test logistic regression classifiers that would decide if a T cell is activated based on its autofluorescence features. For training and testing purposes in this experiment, dish condition (activated or naïve) was assumed to be the ground truth. Receiver operating characteristic (ROC) curves were generated for classifiers that used different combinations of autofluorescence features and compared against one another. The area under the ROC curve is used as a metric of classification performance.

Results are shown in FIGS. 8-11.

The present disclosure also includes the following statements:

1. A T cell classification device comprising:
   a cell analysis pathway comprising:
   (i) an inlet;
   (ii) an observation zone coupled to the inlet downstream of the inlet, the observation zone configured to present T cells for individual time-resolved autofluorescence interrogation; and (iii) an outlet coupled to the observation zone downstream of the observation zone;

a time-resolved autofluorescence decay spectrometer configured to acquire a time-resolved autofluorescence decay signal for a T cell positioned in the observation zone, the time-resolved autofluorescence decay spectrometer comprising a pulsed light source, a photon-counting detector, and photon-counting electronics;

a processor in electronic communication with the time-resolved autofluorescence decay spectrometer; and a non-transitory computer-readable medium accessible to the processor and having stored thereon instructions that, when executed by the processor, cause the processor to:
  a) receive the time-resolved autofluorescence decay signal;
  b) compute at least a first phasor coordinate at a first frequency and a second phasor coordinate at a second frequency from the time-resolved autofluorescence decay signal, wherein the first and second frequency are different; and
  c) compute an activation prediction for the T cell using at least the first phasor coordinate and the second phasor coordinate.

2. The T cell classification device of statement 1, wherein the cell analysis pathway comprises a microfluidic pathway or a nanofluidic pathway.

3. The T cell classification device of statement 1 or 2, the T cell classification device further comprising a flow regulator coupled to the inlet.

4. The T cell classification device of any one of the preceding statements, wherein the flow regulator is configured to provide flow of cells through the observation zone at a rate that allows the time-resolved autofluorescence decay spectrometer to acquire the time-resolved autofluorescence decay signal for the T cell when it is positioned in the observation zone.

5. The T cell classification device of any one of the preceding statements, wherein the pulsed light source emits light having a wavelength tuned to excite fluorescence from NAD(P)H and/or FAD.

6. The T cell classification device of the immediately preceding claim, wherein the wavelength is at least 340 nm, at least 345 nm, at least 350 nm, at least 355 nm, at least 360 nm, at least 365 nm, or at least 370 nm, and at most 415 nm, at most 410 nm, at most 405 nm, at most 400 nm, at most 395 nm, at most 390 nm, at most 385 nm, or at most 380 nm, or wherein the wavelength is between 340 nm and 415 nm, between 350 nm and 410 nm, or between 370 nm and 380 nm, or wherein the wavelength is 375 nm.

7. The T cell classification device of any one of the preceding claims, wherein the pulsed light source emits light having a full width at half maximum pulse width of at least 1 fs, at least 5 fs, at least 10 fs, at least 25 fs, at least 50 fs, at least 100 fs, at least 200 fs, at least 350 fs, at least 500 fs, at least 750 fs, at least 1 ps, at least 3 ps, at least 5 ps, at least 10 ps, at least 20 ps, at least 50 ps, or at least 100 ps, and at most 1 ns, at most 900 ps, at most 750 ps, at most 600 ps, at most 500 ps, at most 400 ps, at most 250 ps, at most 175 ps, at most 100 ps, at most 75 ps, at most 60 ps, at most 50 ps, at most 35 ps, at most 25 ps, at most 20 ps, at most 15 ps, at most 10 ps, or at most 1 ps.

8. The T cell classification device of any one of the preceding claims, wherein the pulsed light source is a diode laser.

9. The T cell classification device of any one of the preceding statements, wherein the time-resolved autofluorescence decay spectrometer is configured to acquire the autofluorescence decay signal at a repetition rate of at least 1 kHz, at least 5 kHz, at least 10 kHz, at least 30 kHz, at least 50 kHz, at least 100 kHz, at least 500 kHz, at least 750 kHz, at least 1 MHz, at least 4 MHz, at least 7 MHz, at least 10 MHz, at least 15 MHz, at least 20 MHz, at least 50 MHz, at least 100 MHz, at least 500 MHz, or at least 1 GHz, and at most 10 THz, at most 1 THz, at most 800 GHz, at most 500 GHz, at most 250 GHz, at most 150 GHz, at most 100 GHz, at most 70 GHz, at most 50 GHz, at most 25 GHz, at most 15 GHz, at most 10 GHz, at most 6 GHz, at most 2 GHz, at most 1 GHz, at most 750 MHz, at most 500 MHz, at most 400 MHz, at most 250 MHz, at most 175 MHz, or at most 100 MHz.

10. The T cell classification device of any one of the preceding statements, wherein the photon-counting detector is a photomultiplier tube, a photodiode, an avalanche photodiode, a single-photon avalanche diode, a charge-coupled device, or a combination thereof.

11. The T cell classification device of any one of the preceding statements, wherein the photon-counting electronics comprise a field-programmable gate array, a dedicated digital signal processor with a digitizer and a time-to-digital converter, a time-correlated single photon counting electronic board with time-to-amplitude and analog-to-digital converter electronics, or a combination thereof.

12. The T cell classification device of any one of the preceding statements, the time-resolved autofluorescence decay spectrometer comprising a detector-side filter configured to transmit fluorescence signals of interest.

13. The T cell classification device of the immediately preceding statement, wherein the detector-side filter is configured to transmit NAD(P)H fluorescence and/or FAD fluorescence.

14. The T cell classification device of any one of the preceding statements, the T cell classification device further comprising a cell size measurement tool configured to measure cell size and to communicate the cell size to the processor.

15. The T cell classification device of the immediately preceding statement, wherein the cell size measurement tool is a microscope.

16. The T cell classification device of any one of the preceding statements, the T cell classification device further comprising a cell imager configured to acquire an image of a cell positioned within the observation zone and to communicate the image to the processor.

17. The T cell classification device of any one of the preceding statements, wherein the cell analysis pathway does not include a fluorescent label for binding to the T cell.

18. The T cell classification device of any one of the preceding statements, wherein the time-resolved autofluorescence decay spectrometer is adapted to measure autofluorescence of T cells without requiring the use of a fluorescent label.

19. The T cell classification device of any one of the preceding statements, wherein the cell analysis pathway does not include an immobilization agent for binding and immobilizing T cells.

20. The T cell classification device of any one of the preceding statements, the T cell classification device further comprising a cell sorter having a sorter inlet and at least two sorter outlets, the cell sorter coupled to the cell analysis pathway via the outlet downstream of the observation zone, the cell sorter configured to selectively direct a cell from the sorter inlet to one of the at least two sorter outlets based on a sort signal, the processor in electronic communication with the cell sorter, and the instructions, when executed by the processor, further cause the processor to provide the sort signal to the cell sorter based on the activation prediction.

21. The T cell classification device of the immediately preceding statement, wherein the processor and physical dimensions and flow rate of the cell analysis pathway are adapted to provide the sort signal to the cell sorter prior to the T cell reaching the cell sorter.

22. The T cell classification device of any one of the preceding statements, wherein the instructions, when executed by the processor, further cause the processor to generate a report including the activation prediction for T cells having passed through the cell analysis pathway.

23. The T cell classification device of any one of the preceding statements, wherein the instructions, when executed by the processor, further cause the processor to compute a third phasor coordinate at a third frequency from the time-resolved autofluorescence decay signal, wherein the third frequency is different than the first frequency and the second frequency, wherein the activation prediction of step c) is computed using the third phasor coordinate.

24. The T cell classification device of the immediately preceding statement, wherein the instructions, when executed by the processor, further cause the processor to compute a fourth phasor coordinate at a fourth frequency from the time-resolved autofluorescence decay signal, wherein the fourth frequency is different than the first frequency, the second frequency, and the third frequency, wherein the activation prediction of step c) is computed using the third phasor coordinate.

25. The T cell classification device of the immediately preceding statement, wherein the instructions, when executed by the processor, further cause the processor to compute a fifth phasor coordinate at a fifth frequency from the time-resolved autofluorescence decay signal, wherein the fifth frequency is different than the first frequency, the second frequency, the third frequency, and the fourth frequency, wherein the activation prediction of step c) is computed using the third phasor coordinate.

26. A method of characterizing T cell activation state, the method comprising:
   a) optionally receiving a population of T cells having unknown activation status;
   b) acquiring a time-resolved autofluorescence decay signal from a T cell of the population of T cells;
   c) computing at least a first phasor coordinate at a first frequency and a second phasor coordinate at a second frequency from the time-resolved autofluorescence decay signal, wherein the first and second frequency are different; and
   d) identifying an activation status of the T cell based on an activation prediction, wherein the activation prediction is computed using at least the first phasor coordinate and the second phasor coordinate.

27. A method of classifying T cells, the method comprising:
   a) receiving a population of T cells having unknown activation status;
   b) acquiring a time-resolved autofluorescence decay signal for each T cell of the population of T cells, thereby resulting in a set of time-resolved autofluorescence decay signals;
   c) computing at least a first phasor coordinate at a first frequency and a second phasor coordinate at a second frequency from each time-resolved autofluorescence decay signal of the set of time-resolved autofluorescence decay signals; and either:
   d1) physically isolating a first portion of the population of T cells from a second portion of the population of T cells based on an activation prediction, wherein each T cell of the population of T cells is placed into the first portion when the activation prediction exceeds a predetermined threshold and into the second portion when the activation prediction is less than or equal to the predetermined threshold; or
   d2) generating a report including the activation prediction, the report optionally identifying a proportion of the population of T cells having the activation prediction that exceeds the predetermined threshold, wherein the activation prediction is computed using at least the first phasor coordinate and the second phasor coordinate.

28. The T cell classification device or the method of any one of the preceding statements, wherein the first frequency is substantially the same as a repetition rate for the pulsed light source.

29. The T cell classification device or the method of any one of the preceding statements, wherein the second frequency is twice the first frequency.

30. The T cell classification device or the method of any one of the preceding statements, wherein the first frequency is 80 MHz and the second frequency is 160 MHz.

31. The T cell classification device or the method of any one of the preceding statements, wherein the time-resolved autofluorescence decay signal is tuned to a wavelength corresponding to NAD(P)H fluorescence and/or FAD fluorescence.

32. The T cell classification device or the method of any one of the preceding statements, wherein the T cells whose activation prediction is positive are CD3+, CD4+ or CD8+ T cells.

33. The method of any one of statements 26 to the immediately preceding statement, the method further comprising computing at least a third phasor coordinate at a third frequency from the time-resolved autofluorescence decay signal, wherein the third frequency is different than the first frequency and the second frequency, wherein the activation prediction is computed using the third phasor coordinate.

34. The method of any one of statements 26 to the immediately preceding statement, the method further comprising computing at least a fourth phasor coordinate at a fourth frequency from the time-resolved autofluorescence decay signal, wherein the fourth frequency is different than the first frequency, the second frequency, and the third frequency, wherein the activation prediction is computed using the fourth phasor coordinate.

35. The method of any one of statements 26 to the immediately preceding statement, the method further comprising computing at least a fifth phasor coordinate at a fifth frequency from the time-resolved autofluorescence decay signal, wherein the fifth frequency is different than the first frequency, the second frequency, the third frequency, and the fourth frequency, wherein the activation prediction is computed using the fifth phasor coordinate.

36. The method of any one of statements 26 to the immediately preceding statement, wherein the method does not involve use of a fluorescent label for binding to the T cell.

37. The method of any one of statements 26 to the immediately preceding statement, wherein the method does not involve immobilizing the T cell.

38. The method of any one of statements 26 to the immediately preceding statement, wherein the method is adapted to use the system and/or one or more features of the system of statements 1 to 25.

39. A method of administering activated T cells to a subject in need thereof, the method comprising:

a) the method of any one of statements 27 to the immediately preceding statement, wherein the method comprises step d1); and
b) introducing the first portion of the population of T cells to the subject.

40. The method of the immediately preceding statement, wherein the first portion of the population of T cells is modified prior to step b).

41. The method of the immediately preceding statement, wherein the first portion of the population of T cells is modified to include a chimeric antigen receptor prior to step b).

42. A method of administering activated T cells to a subject in need thereof, the method comprising:
a) the method of any one of statements 27 to 38, wherein the method comprises step d2); and
b) in response to the proportion exceeding a second predetermined threshold, introducing the population of T cells to the subject.

43. The method of the immediately preceding statement, wherein the population of T cells is modified prior to step b).

44. The method of the immediately preceding statement, wherein the population of T cells is modified to include a chimeric antigen receptor prior to step b).

We claim:

1. A T cell classification device comprising: a cell analysis pathway comprising:
   (i) an inlet;
   (ii) an observation zone coupled to the inlet downstream of the inlet, the observation zone configured to present T cells for individual time-resolved autofluorescence interrogation; and
   (iii) an outlet coupled to the observation zone downstream of the observation zone;
   a time-resolved autofluorescence decay spectrometer configured to acquire a time-resolved autofluorescence decay signal for a T cell positioned in the observation zone, the time-resolved autofluorescence decay spectrometer comprising a pulsed light source, a photon-counting detector, and photon-counting electronics;
   a processor in electronic communication with the time-resolved autofluorescence decay spectrometer; and
   a non-transitory computer-readable medium accessible to the processor and having stored thereon instructions that, when executed by the processor, cause the processor to:
   a) receive the time-resolved autofluorescence decay signal;
   b) compute at least a first phasor coordinate at a first frequency and a second phasor coordinate at a second frequency from the time-resolved autofluorescence decay signal, wherein the first and second frequency are different; and
   c) compute an activation prediction for the T cell using at least the first phasor coordinate and the second phasor coordinate.

2. The T cell classification device of claim 1, wherein the pulsed light source emits light having a wavelength tuned to excite fluorescence from NAD (P) H and/or FAD.

3. The T cell classification device of claim 2, wherein the wavelength is at least 340 nm and at most 415 nm.

4. The T cell classification device of claim 1, wherein the pulsed light source emits light having a full width at half maximum pulse width of at least 1 fs and at most 1 ns.

5. The T cell classification device of claim 1, wherein the pulsed light source is a diode laser.

6. The T cell classification device of claim 1, wherein the time-resolved autofluorescence decay spectrometer is configured to acquire the autofluorescence decay signal at a repetition rate of at least 1 kHz and at most 10THz.

7. The T cell classification device of claim 1, wherein the photon-counting detector is a photomultiplier tube, a photodiode, an avalanche photodiode, a single-photon avalanche diode, a charge-coupled device, or a combination thereof.

8. The T cell classification device of claim 1, wherein the photon-counting electronics comprise a field-programmable gate array, a dedicated digital signal processor with a digitizer and a time-to-digital converter, a time-correlated single photon counting electronic board with time-to-amplitude and analog-to-digital converter electronics, or a combination thereof.

9. The T cell classification device of claim 1, the T cell classification device further comprising a cell sorter having a sorter inlet and at least two sorter outlets, the cell sorter coupled to the cell analysis pathway via the outlet downstream of the observation zone, the cell sorter configured to selectively direct a cell from the sorter inlet to one of the at least two sorter outlets based on a sort signal, the processor in electronic communication with the cell sorter, and the instructions, when executed by the processor, further cause the processor to provide the sort signal to the cell sorter based on the activation prediction.

10. The T cell classification device of claim 1, wherein the instructions, when executed by the processor, further cause the processor to generate a report including the activation prediction for T cells having passed through the cell analysis pathway.

11. The T cell classification device of claim 1, wherein the first frequency is substantially the same as a repetition rate for the pulsed light source.

* * * * *